Aug. 11, 1953          G. J. RIES          2,648,187
ROTARY GRASS AND WEED TRIMMERS
Filed March 11, 1950          2 Sheets—Sheet 1
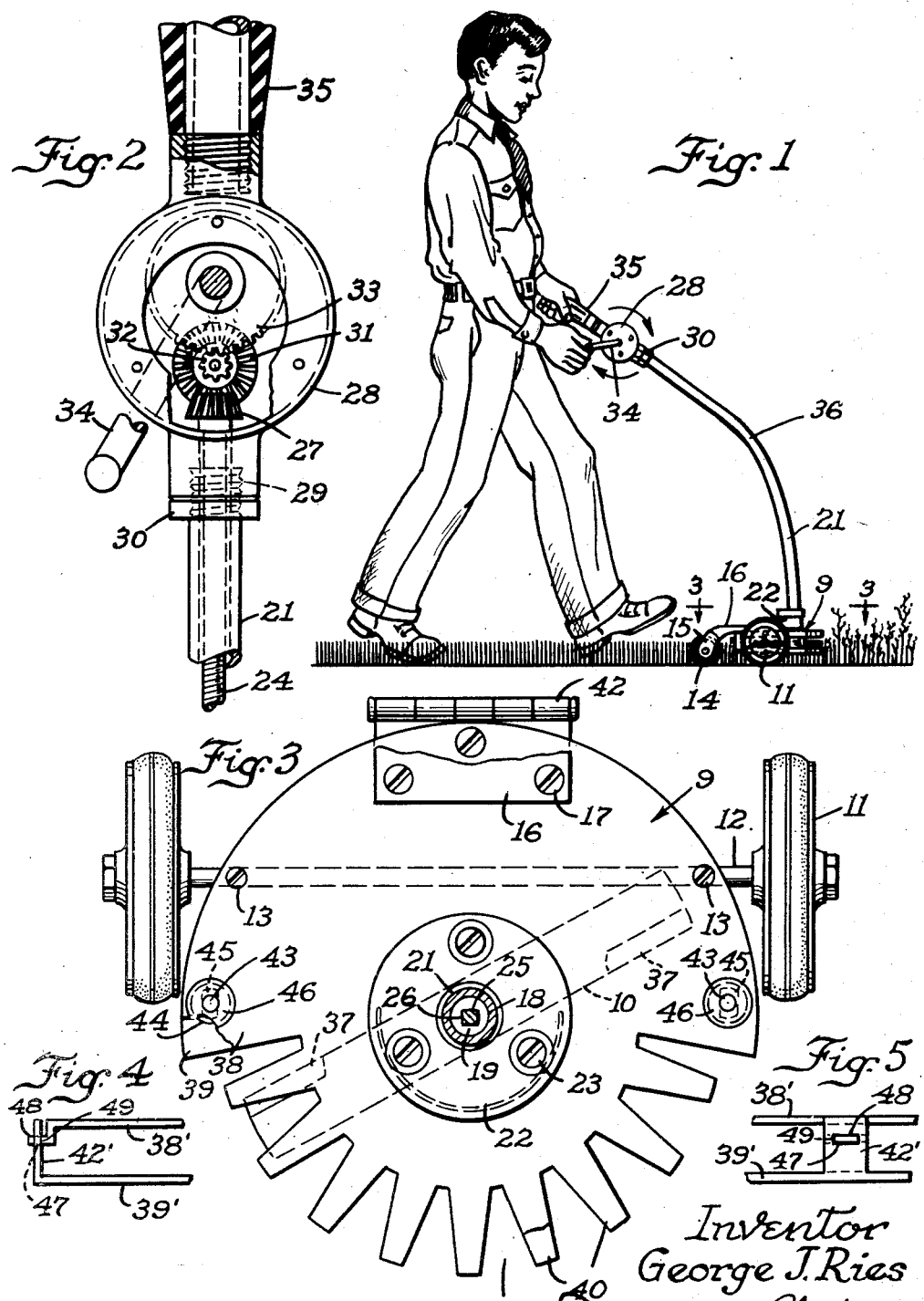
Inventor
George J. Ries

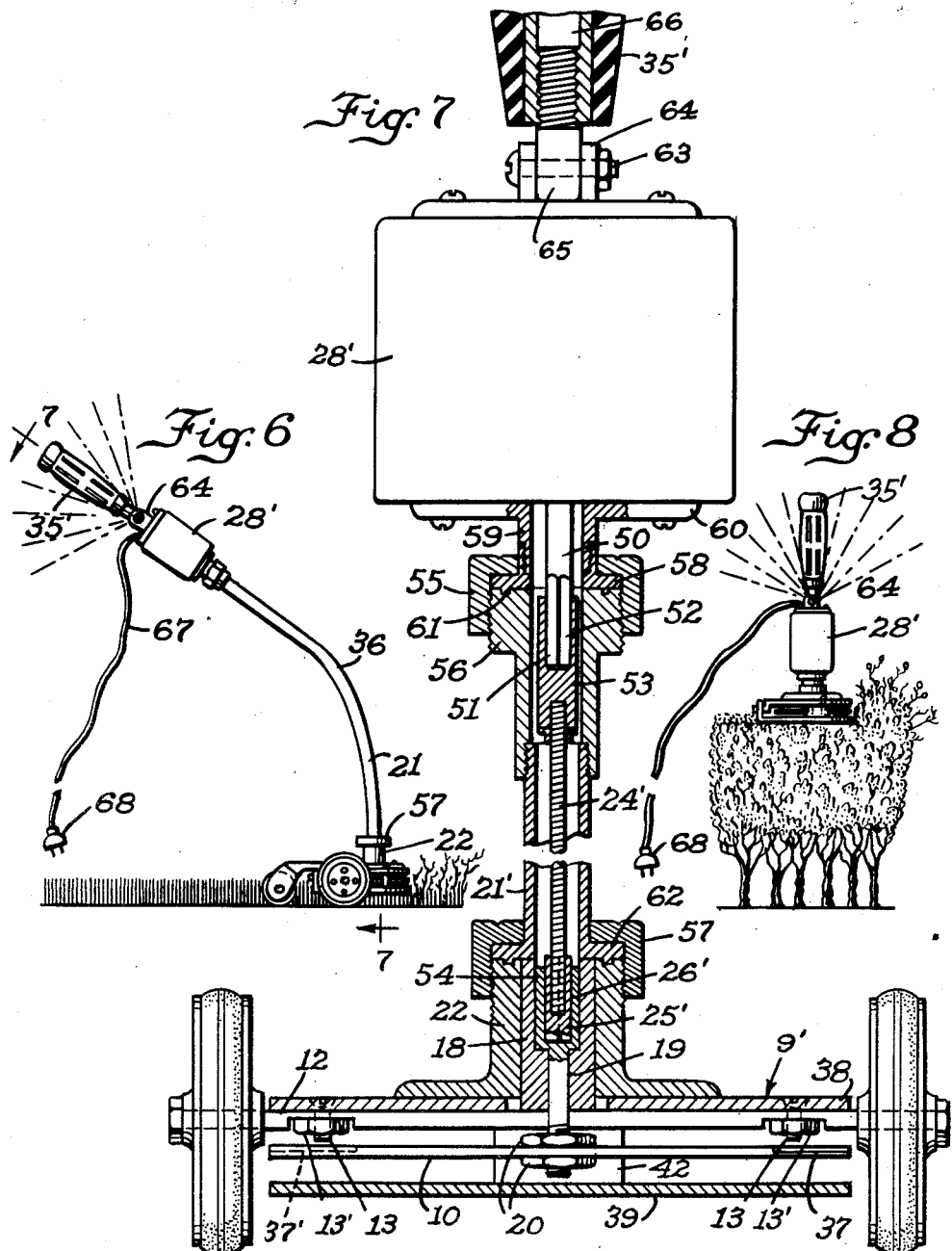

Patented Aug. 11, 1953

2,648,187

UNITED STATES PATENT OFFICE 2,648,187

ROTARY GRASS AND WEED TRIMMER

George J. Ries, Hinsdale, Ill.

Application April 11, 1950, Serial No. 155,330

5 Claims. (Cl. 56—25.4)

1

This invention relates to rotary grass and weed trimmers and has for its principal object the provision of a simple and inexpensive walking type tool of lightweight construction adapted to be maneuvered with ease along sidewalks and around trees and under over-hanging shrubbery and close growing grass and weeds next to foundations.

A salient feature of the manually operated trimmer of my invention is its rotary crank operation and light flexible shaft drive, the crank having a step-up gearing connection with the flexible shaft to enable high speed operation although the crank is turned at only a moderate speed, low enough to eliminate any likelihood of fatigue, the lightweight construction and reduced friction involved in my improved trimmer making the high speed operation by hand possible. The rotatable cutting blade turning at the high speed is adapted to perform the cutting operation by itself and requires only upper and lower guards for its protection against nicking, and the blade together with its supporting stub shaft has sufficient mass to operate with just enough flywheel effect to facilitate the hand crank operation and make it smooth. The flexible shaft drive enables curvature of the handle to the extent necessary to have the hand grip at a comfortable angle in relation to the rest of the trimmer, without involving the necessity of any universal joint connections which would involve added weight and greatly increase the cost.

Another feature of the trimmer is the provision of a hinge connection between the upper and lower guards to permit opening up the blade housing for ease of cleaning, bearing lubrication, and easy removal of the blade whenever it may require sharpening. If desired, I may eliminate the hinge and provide an interlocking lug and slot connection between the back portions of the upper and lower guards. In either case, it will require only the loosening of two thumb screws to permit opening up the blade housing for the purposes mentioned.

The same general design of trimmers may also be provided having an electric motor drive, and it is also contemplated, where an electric motor is substituted for the rotary crank and its associated step-up gearing housing, to have the intermediate tubular handle part detachably connected with the motor housing and blade housing and to have the flexible drive shaft likewise detachably connected at opposite ends with the motor armature shaft and the stub shaft attached to the blade so that the trimmer may be used interchangeably either as a grass and weed trimmer or as a hedge trimmer or clipper for light hedge work.

The invention is illustrated in the accompanying drawings, in which—

Fig. 1 is a side view of a rotary grass and weed trimmer of the hand crank operated type made in accordance with my invention, showing the tool in operation;

Fig. 2 is an enlarged view partly in side elevation and partly in section showing the crank and step-up gearing housing with the side plate removed to better illustrate the construction;

Fig. 3 is an enlarged horizontal section on the line 3—3 of Fig. 1;

Figs. 4 and 5 are framentary views in side and rear elevation, respectively, illustrating a modified or alternative construction for the upper and lower guards, in lieu of the hinge connection illustrated in Fig. 3;

Fig. 6 is a view similar to Fig. 1, but showing a trimmer having an electric motor drive;

Fig. 7 is an enlarged longitudinal section on the broken line 7—7 of Fig. 6 with an intermediate portion of the tubular handle broken away to enable showing the parts on a larger scale, and Fig. 8 is a view of the tool converted to use as a hedge trimmer or clipper.

Similar reference numerals are applied to corresponding parts throughout the views.

Referring first to Figs. 1 to 3, the reference numeral 9 designates the housing for a rotary blade 10 arranged to turn in a horizontal plane on a substantially vertical axis, the housing 9 being supported on a pair of wheels 11, the axle 12 of which is suitably secured by means of screws 13 to the upper portion of the housing 9 in a plane above the plane of operation of the blade 10. Another wheel 14 disposed in trailing relation to the wheels 11 and midway therebetween has the supporting yoke 15 thereof suitably secured by means of an arm 16 to the rear portion of the housing 9, as by means of screws 17. A central bearing 18 is provided on top of the housing 9 and a stub shaft 19 that is suitably secured to the blade 10 as by means of nuts 20 in the manner shown in Fig. 7 is suitably journaled in this bearing. A tubular handle 21 extends upwardly from the top of the housing 9 and has an enlarged pad portion 22 on its lower end fastened as by means of screws 23 to the housing, enclosing the bearing 18. A flexible spring steel drive shaft 24 has a square stud 25 fastened on its lower end and entered in a square hole 26 provided in the upper end portion of the stub shaft 19 to provide a detachable drive connection with the blade 10. The flexible drive shaft 24 extends upwardly through the tubular handle 21 and is suitably connected at its upper end with a bevel pinion 27 in the lower portion of the housing 28 to which the upper end portion of the handle 21 is suitably connected as indicated at 29 and 30. The pinion 27 meshes with a bevel gear 31 to which is fixed a small pinion 32 meshing with a gear 33 arranged to be turned by means of a hand crank 34. A hand grip 35 is rigidly secured to the upper end of the housing 28. The tubular handle 21 is bent intermediate its ends as shown at 36 so as to dispose the hand grip 35 at the convenient angle shown in Fig. 1, making it comfortable to run the trimmer as a walking tool and push it along sidewalks, and around trees, and so forth, in doing the trimming after mowing. The small flexible drive shaft 24 follows the curvature of the handle 21 at the bend 36 and the bend, therefore, does not complicate the drive and does not add noticeably to the resistance to turning of the crank 34. The drive ratio afforded in the gearing in housing 28 is such that the blade 10 can be turned at a speed of 1300 R. P. M. and over when the crank is turned at a moderate speed, and, due to the lightweight construction throughout, such high speed operation by hand is entirely practical and does not cause fatigue even when the trimmer is operated for an hour or more at a time. The torsional and lateral yieldability and resilience of the flexible drive shaft contribute a great deal to the smooth and easy hand operation of the tool.

The blade 19 has cutting edges 37 on opposite sides at opposite ends, clockwise rotation of the blade being obtained with clockwise rotation of the crank 34, as indicated by the arrows in Fig. 1. If desired, however, the blade 10 may be provided with cutting edges on both sides at opposite ends, so that the blade may be turned in either direction and will, of course, cut either way. The blade, together with its driving stub shaft 19, has sufficient mass to give enough flywheel effect in its high speed operation to facilitate the hand crank operation thereof. The housing 9 which encloses the blade is formed by an upper guard plate 38 and a lower guard plate 39 of substantially identical circular form, both having the forward half cut away to provide comb teeth 40 reaching to a radius slightly greater than the radius of the blade 10. The openings 41 between the teeth 40 permit the upstanding grass and weeds to be cut to project into the path of operation of the sharpened outer end portions of the blade 10. A hinge 42, one butt of which is fastened to the top plate 38 and the other butt fastened to the bottom plate 39, connects the rear portions of the plates, and shouldered threaded studs 43 are provided in diametrically opposed relation midway between the comb-toothed front edges and the hinged rear edges of the plates on the lower plate 39 to space the plates in parallel relation by means of the shouldered portions 44 of these studs when the reduced threaded end portions of the studs are extended through elongated holes 45 in the upper plate 38 and have thumb nuts 46 threaded thereon and tightened against the top plates. Obviously, removal of the thumb nuts permits opening the housing 9 for easy cleaning, bearing lubrication, and easy removal of the blade 10 for sharpening. It is, of course, also evident that when the housing 9 is opened, the axle 12 can also be removed by removing the nuts 13'. The axle 12 is removed only in that form of the invention disclosed in Fig. 8, where the trimmer is converted to use as a hedge trimmer or clipper.

If desired, the hinge connection 42 may be dispensed with and a simpler and cheaper interfitting lug and slot connection may be provided, as illustrated in Figs. 4 and 5, wherein 38' designates the upper plate and 39' the lower plate. 42' is an upwardly projecting lug on the rear edge of the lower plate having a slot 47 provided therein near the top thereof, into which a rearwardly projecting lug 48 provided on the rear edge of the upper plate 38' is slidably received, shoulders 49 being provided on the lug 48 for abutment with the front face of the lug 42' to limit rearward movement of the upper plate relative to the bottom plate and accordingly hold the plates in rigid relation when the thumb nuts 46 are tightened.

Referring now to Figs. 6 and 7, the numeral 28' designates the housing of an electric motor which replaces housing 28 and the hand crank 34 and, of course, the step-up gearing in the housing operated by the crank. The armature shaft 50 of the motor 28' has a square end 51 slidably received in a square socket 52 provided in a coupling member 53 that is suitably secured onto the upper end of the flexible drive shaft 24'. The latter has the lower end portion thereof suitably secured in a square plug member 25' slidably received in a square socket 26' provided in the enlarged upper end portion 54 of the stub shaft 19. In that way, one may remove the flexible drive shaft 24' together with the intermediate handle 21' and connect the armature shaft 50 directly with the stud shaft 19 when the trimmer is to be operated as a hedge trimmer or clipper in the manner shown in Fig. 8, the squared end 51 of the armature shaft being made to fit the square socket 26' interchangeably with the squared plug 25', and the coupling nut 55, by means of which the motor housing 28' is adapted to be connected with the handle 21' by threaded connection with the coupling member 56 provided on the upper end thereof, being interchangeably threadable onto the neck of the part 22 on housing 9' in place of the coupling nut 57. An annularly flanged collar 58 threaded on the neck 59 on end plate 60 on the housing of motor 28' has dowel pin projections 61 seating in recesses provided therefor in the coupling member 56 so that when the nut 55 is tightened, the motor is fixed in rigid relationship to the handle 21. In a similar manner, an annular flange 62 is provided on the lower end of the handle 21' to cooperate with the coupling nut 57 for fastening the handle 21' in rigid relationship to housing 9'. The handle 21' preferably has the same bend 36 intermediate its ends as in the construction of Fig. 1, but the hand grip 35, which may, if desired, be made as a rigid extension on the motor housing, is herein shown as having a horizontally adjustable connection with said housing, by means of a horizontal bolt 63 entered through a clevis 64 provided on the motor housing, the tightening of the bolt 63 serving to clamp the eyelet end 65 of the stud 66 carrying the hand grip 35', whereby to hold the hand grip in any desired angular relation to the motor housing that best suits the convenience of the operator. The adjustability of the hand grip is, of course, of particular advantage when the trimmer is converted to use as a hedge clipper or trimmer, because then the motor 28' is frequently operated on a vertical axis and it would be awkward to operate the device with the handle in an upright position. The motor may be of any suitable or preferred type and has an extension cord 67 of suitable length extending therefrom and fitted with the usual attachment plug 68 on the free end thereof for insertion in the usual receptacle.

It is believed the foregoing description conveys a good understanding of the objects and advantages of my invention. The appended claims have been drawn to cover all legitimate modifications and adaptations.

I claim:

1. In a rotary cutting device for trimming grass, weeds and like standing material, the combination comprising a housing having supporting ground engaging means carried thereby, said housing being constituted by upper and lower plates arranged in parallel spaced relation, the leading peripheral portions of said plates being arcuate and including aligned slots extending inward from the periphery into which the standing material is gathered by forward movement of the device, a cutter blade mounted between said plates for rotation in a plane parallel to the plates, said blade terminating just short of the entire periphery of said plates and having a cutting edge generally coextensive with the slots in said plates, and means for driving said blade in rotation.

2. A rotary cutting device as defined in claim 1 wherein the upper and lower plates constituting said housing are structurally separable and which further includes readily detachable means maintaining said plates in the said parallel spaced relation.

3. Apparatus for trimming upstanding material such as grass, weeds, hedges and the like comprising a housing, a cutter blade rotatably mounted in said housing, an elongated tubular handle member, a drive shaft extending through said handle member, a motor enclosed within a housing, a first coupling device including a coupling member on the motor housing and a complementary coupling member at the upper end of said handle member connecting the said motor housing to the upper end of said handle member and the motor shaft to the upper end of said drive shaft, and a second coupling device including a coupling member on the blade housing and a complementary coupling member at the lower end of said handle member connecting the lower end of said handle member to said blade housing and the lower end of said drive shaft to said cutter blade, said first and second coupling devices being structurally alike whereby to enable the coupling member on said motor housing to also be connected directly onto the coupling member of said blade housing and with the motor shaft coupled to the cutter blade with said handle member and drive shaft removed.

4. Apparatus for trimming upstanding material as defined in claim 3 wherein the coupling members on said motor housing and at the lower end of said handle are constituted by like threaded nuts and the coupling members at the upper end of said handle and on said cutter blade housing are constituted by like threaded portions thereof interchangeably engageable with said nuts.

5. Apparatus for trimming upstanding material such as grass, weeds, hedges and the like comprising a housing, a cutter blade mounted for rotation in said housing, said housing including an upright threaded neck portion and a stub shaft journalled therein to which said cutter blade is secured, said stub shaft including a socket at its upper end, an elongated tubular handle, a drive shaft extending through said handle, said drive shaft at the upper end of said handle being provided with a socket and with a plug at the lower end of said handle, the upper end of said handle being threaded and the lower end of said handle being provided with a first threaded coupling nut thereon threaded onto the threaded neck portion of said housing and with the plug at the lower end of said drive shaft received in the socket at the upper end of said stub shaft, a motor enclosed within a housing, said motor housing including a neck portion through which the motor shaft extends, and a second threaded coupling nut arranged on said neck portion and which is threaded onto the threaded upper end of said handle and with the motor shaft received in the socket at the upper end of said drive shaft, the threaded neck portion of said blade housing and the threaded portion at the upper end of said handle being alike, said first and second coupling nuts being alike, said sockets at the upper end of said stub shaft and upper end of said drive shaft being alike, and said plug at the lower end of said drive shaft being like said motor shaft, whereby to enable said motor housing to be also connectable directly upon said blade housing and said motor shaft coupled directly to said stub shaft with said handle and drive shaft therein removed.

GEORGE J. RIES.

References Cited in the file of this patent

UNITED STATES PATENTS

| Number | Name | Date |
|---|---|---|
| 1,375,195 | Wikstrom | Apr. 19, 1921 |
| 1,902,114 | Beanblossom | Mar. 21, 1933 |
| 2,232,261 | Orr | Feb. 18, 1941 |
| 2,263,431 | White | Nov. 18, 1941 |
| 2,458,200 | Renfroe et al. | Jan. 4, 1949 |
| 2,487,224 | Dreischerf | Nov. 8, 1949 |
| 2,519,779 | Moon | Aug. 22, 1950 |